(12) United States Patent
Klein et al.

(10) Patent No.: US 12,292,787 B2
(45) Date of Patent: May 6, 2025

(54) MIGRATION PAYROLL RECONCILIATION

(71) Applicant: ADP, Inc., Roseland, NJ (US)

(72) Inventors: Eitan Klein, Saint James, NY (US); Jessica A. Tatz, Denville, NJ (US); Mohammed B. Ahmed, Jersey City, NJ (US); Jonathan Baier, Lovettsville, VA (US)

(73) Assignee: ADP, Inc., Roseland, NJ (US)

( * ) Notice: Subject to any disclaimer, the term of this patent is extended or adjusted under 35 U.S.C. 154(b) by 106 days.

(21) Appl. No.: 17/698,310

(22) Filed: Mar. 18, 2022

(65) Prior Publication Data

US 2023/0297463 A1 Sep. 21, 2023

(51) Int. Cl.
*G06F 16/30* (2019.01)
*G06F 11/07* (2006.01)
*G06F 16/21* (2019.01)
*G06F 16/27* (2019.01)

(52) U.S. Cl.
CPC ........ *G06F 11/0793* (2013.01); *G06F 16/214* (2019.01); *G06F 16/27* (2019.01)

(58) Field of Classification Search
CPC .............................. G06F 16/27; G06F 16/214
See application file for complete search history.

(56) References Cited

U.S. PATENT DOCUMENTS

| 2008/0281820 | A1* | 11/2008 | Do ........................ G06F 16/214 |
| 2015/0248403 | A1* | 9/2015 | Pazdziora ............. G06F 16/214 |
| | | | 707/809 |
| 2019/0197171 | A1* | 6/2019 | Tiwari ..................... G06F 3/067 |
| 2020/0394164 | A1* | 12/2020 | Apte .................... G06F 16/2282 |
| 2022/0129425 | A1* | 4/2022 | Daimler ................ G06F 16/211 |

* cited by examiner

*Primary Examiner* — Khanh B Pham
(74) *Attorney, Agent, or Firm* — Foley & Lardner LLP (57) ABSTRACT

The present disclosure relates generally to data migration and, more particularly, to a system and method for post migration payroll reconciliation. The method of migrating data includes: receiving, by a computer system, projected input codes of a first system for use by a payroll engine; receiving, by the computer system, actual input codes of a second system for use by the payroll engine; comparing, by the computer system, the projected input codes to the actual input codes to determine misalignment of input codes between the first system and the second system; and mapping the misaligned projected input codes to the actual input codes.

19 Claims, 9 Drawing Sheets

MIGRATION PAYROLL RECONCILIATION

TECHNICAL FIELD

The present disclosure relates generally to data migration and, more particularly, to a system and method for migration payroll reconciliation.

BACKGROUND

Human Resource (HR) platforms communicate with payroll engines by presenting data stored within the system of record to the payroll engine (e.g., hours worked on a given rate, employee information, benefits, etc.). In this way, the payroll engine can use the data from the HR platform to generate payroll for employees. However, when migrating data to a different HR platform, teams or experts must debug issues like misconfiguration of application settings and incorrect data load, which is a time consuming and expensive process. For example, to ensure that the data is clean and is migrated properly, payroll processes need to be run in parallel using data from both the legacy system and the data migrated to the new system from the legacy system. Extracting the correct values from the new system depends on many dimensions including, e.g., client configuration (initial setup), setting up business mini applications (BMA) and technical mini applications (TMA), loading of the data, correctly attribute/classify the data, rounding correctly and/or store the data in the expected format, amongst other dimensions. The outputs of the payroll process, e.g., payroll engine, are then compared together to ensure that the data used from the new system matches to the data used from the legacy system. This process requires many different payroll runs using data from both the legacy system and the new system.

And, as the payroll engine will be using data from the legacy system and the new system, a comparison of the output can be made to determine whether the information has been properly migrated between the systems. If not, forensics must be performed on the output to determine the cause of the incorrect output. The problems can arise from countless input sources such as a mismatch in deductions, hours worked, etc., and is thus very time consuming and expensive to perform.

SUMMARY

In a first aspect of the present disclosure, a method includes: receiving, by a computer system, projected input codes of a first system for use by a payroll engine; receiving, by the computer system, actual input codes of a second system for use by the payroll engine; comparing, by the computer system, the projected input codes to the actual input codes to determine misalignment of input codes between the first system and the second system; and mapping the misaligned projected input codes to the actual input codes.

In another aspect of the present disclosure, there is a computer program product. The computer program product includes one or more computer readable storage media having program instructions collectively stored on the one or more computer readable storage media. The program instructions are executable to: receive projected codes associated with input data of a legacy system; receive actual codes of a second system also associated with the input data; match patterns of the projected codes and the actual codes; align any mismatching of the projected codes and the actual codes; migrating the input data of the legacy system to the aligned the actual codes; and sending the input data to a payroll engine for calculation of a payroll.

In a further aspect of the present disclosure, there is a computer system which includes a processor, a computer readable memory, one or more computer readable storage media, and program instructions collectively stored on the one or more computer readable storage media. The program instructions are executable to: iteratively compare projected input codes to actual input codes; determine misalignment between the projected input codes to actual input codes; map the misaligned projected input codes to the actual input codes; and correlate input data previously associated with the projected input codes to the actual input codes; and stream the input data to a payroll engine.

BRIEF DESCRIPTION OF THE DRAWINGS

Aspects of the present disclosure are described in the detailed description which follows, in reference to the noted plurality of drawings by way of non-limiting examples of exemplary embodiments of the present disclosure.

DETAILED DESCRIPTION OF ASPECTS OF THE INVENTION

The present disclosure relates generally to data migration and, more particularly, to a system and method for migration payroll reconciliation. More specifically and in accordance with aspects of the present disclosure, the system and method enable an implementation persona to review effectiveness of a payroll migration process from a data input perspective instead of managing the details of such migration from an output perspective. For example, the system and method may evaluate input data from a code perspective in a multiphase process to accurately migrate payroll data from a legacy human resource system to a different (e.g., upgraded) human resource system, e.g., Lifion® by ADP Inc., for use in calculating payroll using a payroll engine. Advantageously, by implementing the system and method (hereinafter referred to as a migration system), it is now possible to isolate payroll discrepancies within the payroll results by exposing best practices and the ability to present proactive recommendations thereby significantly improving implementation of such payroll migration to a payroll engine. For example, by implementing the different aspects described herein, it becomes easier to detect a problem closer to the source without the need for long or heavy payroll cycles, while providing accurate payroll calculations and related functionality associated with such payroll calculations using, for example, a payroll builder (e.g., payroll engine).

In more specific embodiments, the migration system is configured to evaluate correctness of the input data (e.g., input codes) vs. the expected result or output of a legacy system. The input codes may be associated with payroll data, for example, tax information, wages, hours worked, deductions for savings and/or medical plans, liens, vacation balances, employee identification information, or other data needed to calculate payroll information in a payroll engine (e.g., also referred to as a payroll calculation system), each of which may be associated with a unique input code in both a legacy system and a different human resource system, e.g., Lifion.

For example, a data protocol is provided between the payroll engine to a human capital management (HCM) platform (e.g., HR system). The migration system is capable of identifying and matching sequences of input codes from a legacy system (HCM platform) and translate or match them to the input codes of the new system such that the new system is now capable of understanding data issues without the need to communicate with payroll engine, e.g., read data directly from a payroll builder application. In implementation, the migration system may rely on methods configured to find matching patterns of input codes, and correct setting/values for non-matching patterns prior to migration of the input data and calculation of the payroll using a payroll engine. It should be understood by those of skill in the art that the input codes are associated with input data, where the input codes may be different between the legacy system and the new system. These input codes may be behind data used to calculate the payroll such as, but not limited to, e.g., benefit information, payroll deductions for medical or retirement, tax information, wages, hours worked, hourly wage, overtime wage, employee ID information, etc.

The migration system described herein provides a technical solution to a problem by automatically addressing the migration of payroll data which is to be used by a payroll engine for accurate and repeatable payroll calculations, without the need to analyze or perform forensics on the output data, itself. The migration system described herein further provides a technical solution to enable sampling of a current state and measuring the progression of the data by verifying elements of the data by loading the data and measuring the ability to transmit the data to a payroll engine correctly. Generally, this technical solution can be accomplished by, amongst other features as described herein, looking to the input codes on the input side, instead of analyzing the actual output itself, i.e., the payroll check. More specifically, the migration system matches the input codes used in different systems, uses the input codes to correctly migrate and map the input data from one system (e.g., legacy system) to another system, and with this input codes properly migrated, the payroll engine can accurately calculate payroll information.

By performing the functionality described herein on the input side, it is possible to proactively ensure that the output is correct, e.g., by matching the input codes between different systems it is possible to ensure that the payroll calculations use the correct input data as it was migrated to the new system. This is compared to conventional methods in which a reactive approach is utilized in which a user compares the output of the payroll engine, e.g., paycheck, with the inputs provided by the different systems to determine if a mistake has occurred. This latter approach is error prone and very time consuming as it requires a comparison between the output of the newer system using the migrated data to the output of a legacy system; whereas the approach taken by the system and method described herein, provides accurate data migration, upfront, thereby resulting in an accurate output.

Figure 1:
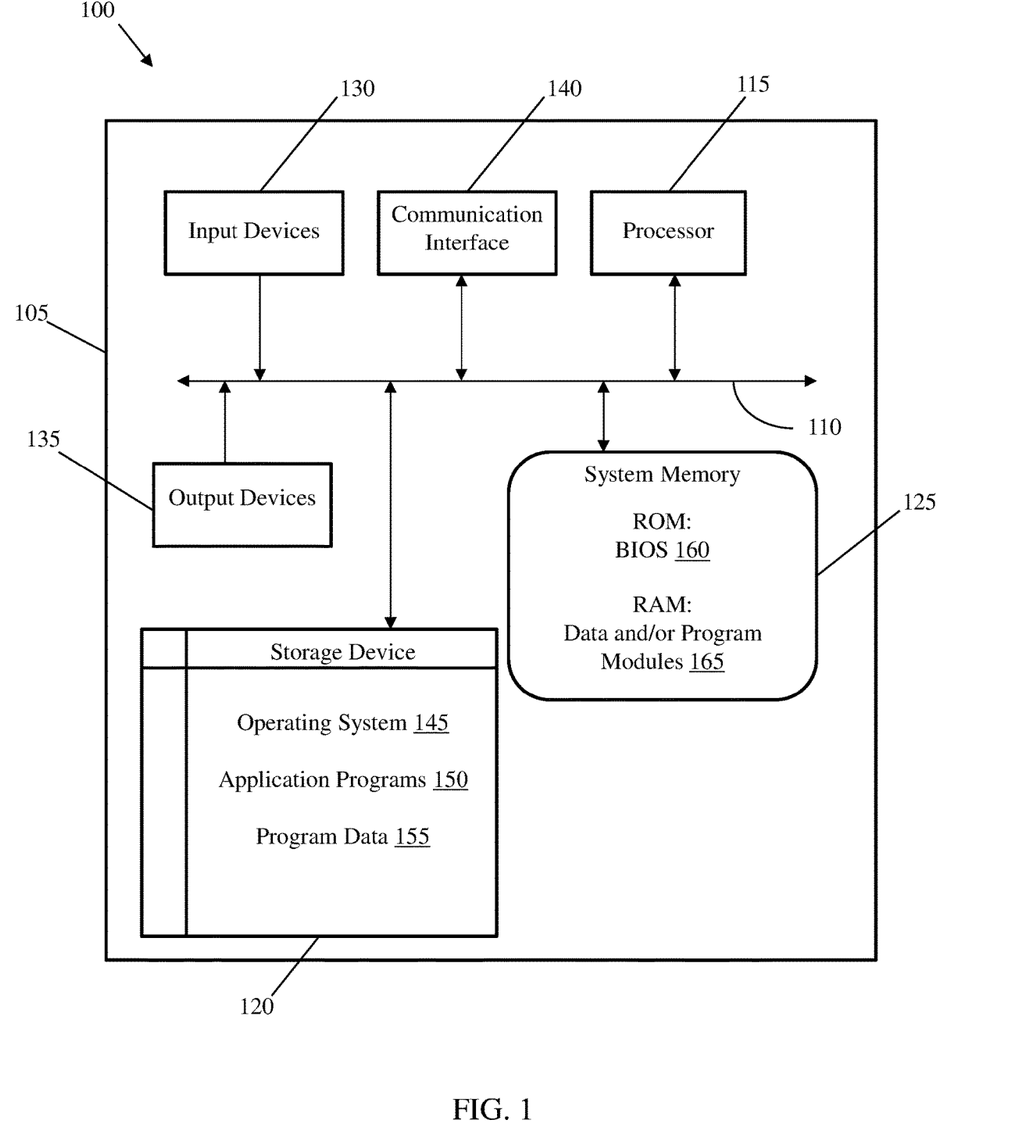
FIG. 1 is an illustrative architecture of a computing system implemented in embodiments of the present disclosure.

FIG. 1 is an illustrative architecture of a computing system 100 implemented in embodiments of the present disclosure. The computing system 100 is only one example of a suitable computing system and is not intended to suggest any limitation as to the scope of use or functionality of the disclosure. Also, computing system 100 should not be interpreted as having any dependency or requirement relating to any one or combination of components illustrated in computing system 100. Moreover, the system and method described herein may be implemented in the computing system 100 or provided on a computer program product.

As shown in FIG. 1, computing system 100 includes a computing device 105. The computing device 105 can be resident on a network infrastructure such as within a cloud environment or may be a separate independent computing device (e.g., a computing device of a third-party service provider). The computing device 105 may include a bus 110, a processor 115, a storage device 120, a system memory (hardware device) 125, one or more input devices 130, one or more output devices 135, and a communication interface 140.

The bus 110 permits communication among the components of computing device 105. For example, bus 110 may be any of several types of bus structures including a memory bus or memory controller, a peripheral bus, and a local bus using any of a variety of bus architectures to provide one or more wired or wireless communication links or paths for transferring data and/or power to, from, or between various other components of computing device 105.

The processor 115 may be one or more processors or microprocessors that include any processing circuitry operative to interpret and execute computer readable program instructions, such as program instructions for controlling the operation and performance of one or more of the various other components of computing device 105. For example, processor 115 may be configured to map data on the input level using respective input codes associated the input data, prior to data migration from a legacy system. More specifically, processor 115 may be configured to match (e.g., correlate) input codes associated with the input data from the legacy system with input codes used in another system, e.g., Lifion.

By providing such mapping and/or matching capabilities, it is possible to translate one code to another code and compare data against the source of truth, e.g., the legacy system, itself, as opposed to an export from a human resource system, other systems, or the output itself. This will ensure that the input data migrated into the new system will be understood by the new system. And, with the proactive processes used at the input level, the migrated input data can then be used generate an accurate output, e.g., in a payroll engine. In this way, there is forensics at the output level can be considerably reduced; that is, there is no need to run the payroll calculation using information from a legacy system and compare such payroll calculation (e.g., output) to the output received from the newer system to determine if any errors in the payroll have occurred.

In embodiments, processor 115 interprets and executes the processes, steps, functions, and/or operations of the present disclosure, which may be operatively implemented by the computer readable program instructions. In embodiments, processor 115 may receive input signals from one or more input devices 130 and/or drive output signals through one or more output devices 135. The input devices 130 may be, for example, one or more mechanisms that permit an operator to input information to computing device 105 such as a keyboard, touch sensitive user interface (UI), etc. The one or more output devices 135 may include one or more mechanisms that output information to an operator, e.g., any display device, printer, etc.

The storage device 120 may include removable/non-removable, volatile/non-volatile computer readable media, such as, but not limited to, non-transitory media such as magnetic and/or optical recording media and their corresponding drives. The drives and their associated computer readable media provide for storage of computer readable program instructions, data structures, program modules and other data for operation of computing device 105 in accordance with the different aspects of the present disclosure. In embodiments, storage device 120 may store operating system 145, application programs 150, and program data 155 in accordance with aspects of the present disclosure.

The system memory 125 may include one or more storage mediums, including for example, non-transitory media such as flash memory, permanent memory such as read-only memory ("ROM"), semi-permanent memory such as random-access memory ("RAM"), any other suitable type of storage component, or any combination thereof. In some embodiments, an input/output system 160 (BIOS) including the basic routines that help to transfer information between the various other components of computing device 105, such as during start-up, may be stored in the ROM. Additionally, data and/or program modules 165, such as at least a portion of operating system 145, application programs 150, and/or program data 155, that are accessible to and/or presently being operated on by processor 115 may be contained in the RAM.

The communication interface 140 may include any transceiver-like mechanism (e.g., a network interface, a network adapter, a modem, or combinations thereof) that enables computing device 105 to communicate with remote devices or systems, such as a mobile device or other computing devices such as, for example, a server in a networked environment, e.g., cloud environment. For example, computing device 105 may be connected to remote devices or systems via one or more local area networks (LAN) and/or one or more wide area networks (WAN) using communication interface 140.

As thus discussed herein, computing system 100 may be configured to map input codes between different systems prior to data migration into a payroll engine. By mapping of the input codes, it is possible to produce input streams and, more specifically, perform a loop back correction stream which allows for a stabilized output from the payroll engine. In particular, computing device 105 may perform tasks (e.g., process, steps, methods and/or functionality) in response to processor 115 executing program instructions contained in a computer readable medium, such as system memory 125. The program instructions may be read into system memory 125 from another computer readable medium, such as data storage device 120, or from another device via the communication interface 140 or server within or outside of a cloud environment. In embodiments, an operator may interact with computing device 105 via the one or more input devices 130 and/or the one or more output devices 135 to facilitate performance of the tasks and/or realize the end results of such tasks in accordance with aspects of the present disclosure. In additional or alternative embodiments, hardwired circuitry may be used in place of or in combination with the program instructions to implement the tasks, e.g., steps, methods and/or functionality, consistent with the different aspects of the present disclosure. Thus, the steps, methods and/or functionality disclosed herein can be implemented in any combination of hardware circuitry and software.

Figure 2:
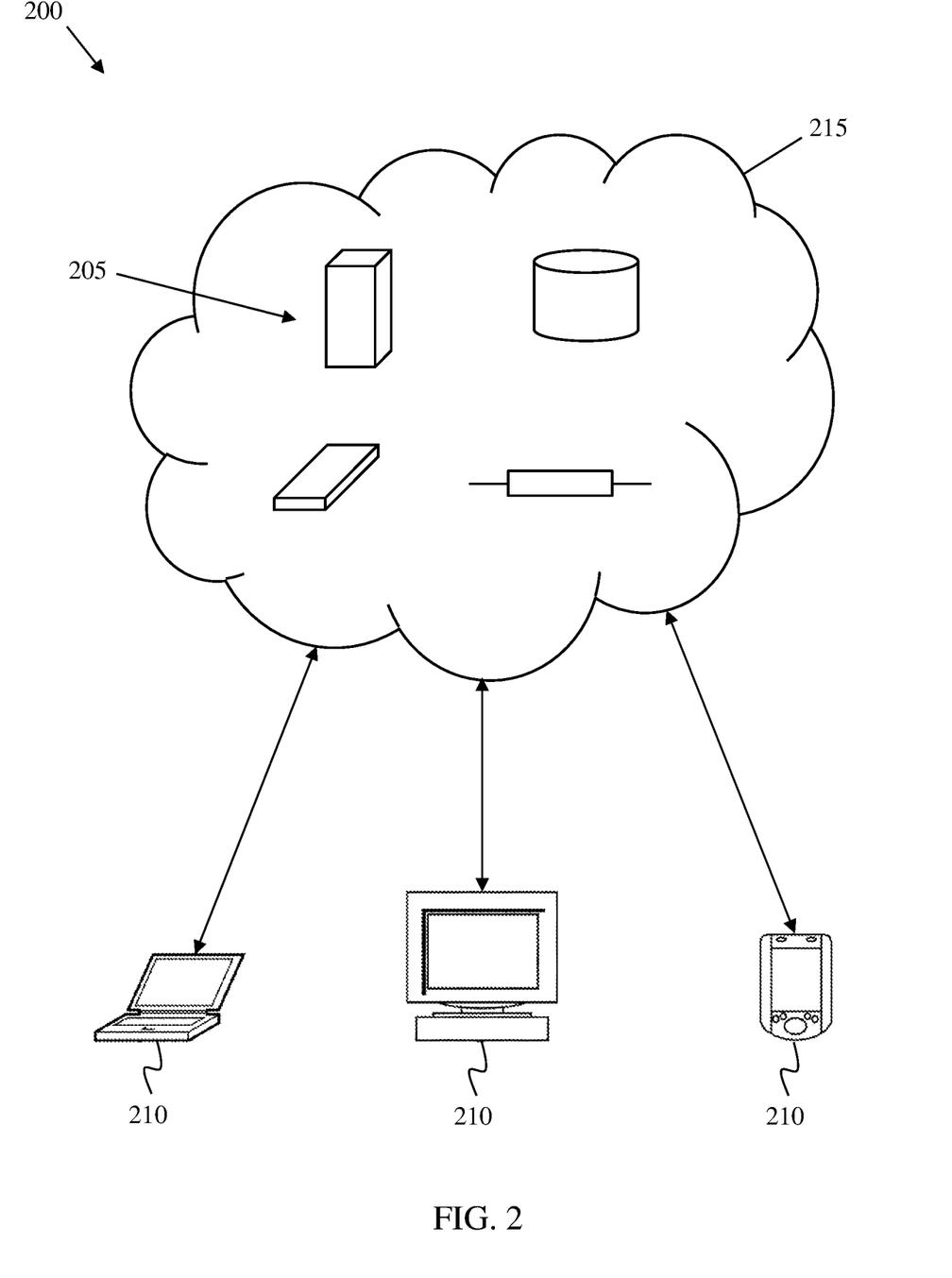
FIG. 2 shows an exemplary cloud computing environment in accordance with aspects of the present disclosure.

FIG. 2 shows an exemplary cloud computing environment 200 in accordance with aspects of the disclosure. Cloud computing is a computing model that enables convenient, on-demand network access to a shared pool of configurable computing resources, e.g., networks, servers, processing, storage, applications, and services, that can be provisioned and released rapidly, dynamically, and with minimal management efforts and/or interaction with the service provider. In embodiments, one or more aspects, functions and/or processes described herein may be performed and/or provided via cloud computing environment 200.

As depicted in FIG. 2, cloud computing environment 200 includes cloud resources 205 that are made available to client devices 210 via a network 215, such as the Internet. Cloud resources 205 can include a variety of hardware and/or software computing resources, such as servers, databases, storage, networks, applications, and platforms. Cloud resources 205 may be on a single network or a distributed network. Cloud resources 205 may be distributed across multiple cloud computing systems and/or individual network enabled computing devices. Client devices 210 may comprise any suitable type of network-enabled computing device, such as servers, desktop computers, laptop computers, handheld computers (e.g., smartphones, tablet computers), set top boxes, and network-enabled hard drives. Cloud resources 205 are typically provided and maintained by a service provider so that a client does not need to maintain resources on a local client device 210. In embodiments, cloud resources 205 may include one or more computing system 100 of FIG. 1 that is specifically adapted to perform one or more of the functions and/or processes described herein.

Cloud computing environment 200 may be configured such that cloud resources 205 provide computing resources to client devices 210 through a variety of service models, such as Software as a Service (SaaS), Platforms as a service (PaaS), Infrastructure as a Service (IaaS), and/or any other cloud service models. Cloud resources 205 may be configured, in some cases, to provide multiple service models to a client device 210. For example, cloud resources 205 can provide both SaaS and IaaS to a client device 210. Cloud resources 205 may be configured, in some cases, to provide different service models to different client devices 210. For example, cloud resources 205 can provide SaaS to a first client device 210 and PaaS to a second client device 210.

Cloud computing environment 200 may be configured such that cloud resources 205 provide computing resources to client devices 210 through a variety of deployment models, such as public, private, community, hybrid, and/or any other cloud deployment model. Cloud resources 205 may be configured, in some cases, to support multiple deployment models. For example, cloud resources 205 can provide one set of computing resources through a public deployment model and another set of computing resources through a private deployment model.

In embodiments, software and/or hardware that performs one or more of the aspects, functions and/or processes described herein may be accessed and/or utilized by a client (e.g., an enterprise or an end user) as one or more of a SaaS, PaaS and IaaS model in one or more of a private, community, public, and hybrid cloud. Moreover, although this disclosure includes a description of cloud computing, the systems and methods described herein are not limited to cloud computing and instead can be implemented on any suitable computing environment.

Cloud resources 205 may be configured to provide a variety of functionality that involves user interaction.

Accordingly, a user interface (UI) can be provided for communicating with cloud resources 205 and/or performing tasks associated with cloud resources 205. The UI can be accessed via a client device 210 in communication with cloud resources 205. The UI can be configured to operate in a variety of client modes, including a fat client mode, a thin client mode, or a hybrid client mode, depending on the storage and processing capabilities of cloud resources 205 and/or client device 210. Therefore, a UI can be implemented as a standalone application operating at the client device in some embodiments. In other embodiments, a web browser-based portal can be used to provide the UI. Any other configuration to access cloud resources 205 can also be used in various implementations.

Figure 3:
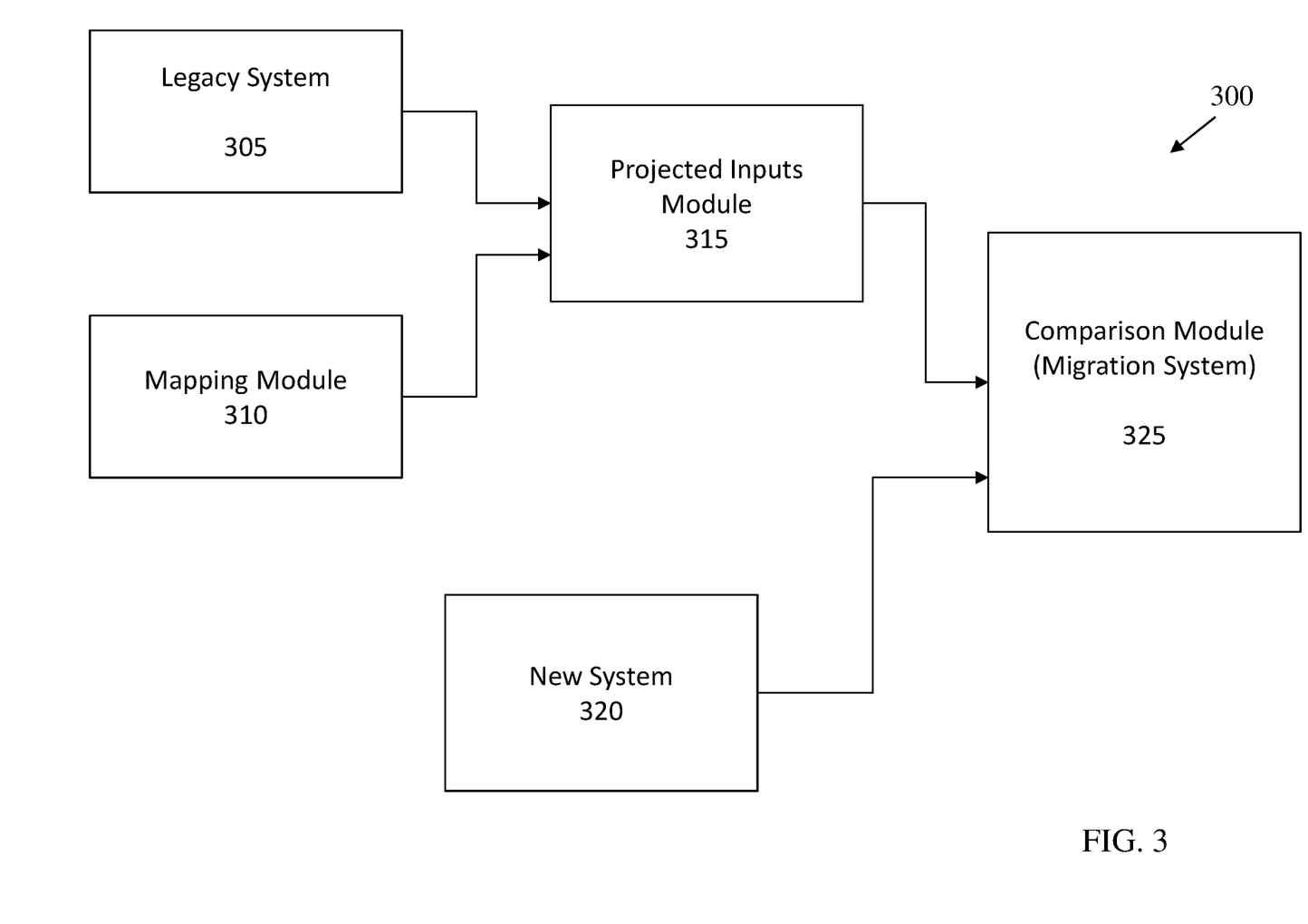
FIG. 3 shows a block diagram in accordance with aspects of the present disclosure.

FIG. 3 shows a functional block diagram 300 that illustrates functionality in accordance with aspects of the present disclosure. In embodiments, the block diagram 300 includes a legacy system 305 and a new system 320. The legacy system 305 may be representative of a human resource system, which is to be exchanged or upgraded with the new system 320. It should be understood by those of ordinary skill in the art that both the legacy system 305 and the new system 320 include input data codes which may be different from one another. For example, the input data code for a deduction in the legacy system 305 may be "x", compared to the input data code for the same deduction in the new system 320 being "y". Accordingly, as each system 305, 320 has different input data codes, the issue arises that migrated input data from the legacy system 305 may not be matched properly to the input data codes of the new system 320. This mismatched data may then be used by a payroll engine, which would result in an output that has errors. This problem is solved in the present disclosure as described herein.

Still referring to FIG. 3, the legacy system 305 provides streams of data to a projected input module 315. In embodiments, the data streams may be presented as a token of textual sequences, for example. A mapping module 310, which may be representative of a swift map, provides data to the projected input module 315. In embodiments, the mapping module 310 may be connected to a back-end system, (e.g., legacy system 305). The mapping module 310 may bring all the input codes expected to be in the back-end system, e.g., legacy system, to the projected input module 315. For example, the mapping module 310 may be used to define what the migrated data is to be in a payroll engine. As should be understood, illustratively, the mapping module 310 converts arrays of information into dictionary definitions by mapping a sequence of values according to known logic, similar to a look-up table. In embodiments, the swift map gives it a lookup table and the runtime values are translated with the lookup tables and other values.

The information of the legacy system 305 and the mapping module 310 may be provided to the projected inputs module 315. The projected inputs module 315 uses this information to generate projected values, e.g., look-up tables, which may be representative of projected input codes used by a payroll engine. This basically is a classification of the input data codes of the legacy system 305 (to what may be expected in the new system) enabling some migration of the data inputs by developing some suggested mapping between the input data codes of the legacy system 305 and the payroll engine or new system 320.

The new system 320, on the other hand, transmits the actual values, e.g., actual input data codes, that are used in the new system 320, to the comparison module 325. The comparison module 325 compares the projected values to the actual values and determines whether there is any misalignment of the input data codes of the legacy system 305 and the new system 320. Moreover, in embodiments, finding that there is a misalignment of the data codes, it is now possible to proactively correct such misalignment by correctly mapping the data input codes in the context of what these codes mean from the legacy system 305. The correlated input data codes may then be used to certify the new system 320; that is, it is now possible to determine that the input data codes are clean and properly correlated with the input data codes of the legacy system 305 to ensure that the actual input data used for calculation in the payroll engine has been properly assigned in the new system 320 and then the correct input data has been passed to the payroll engine. In other words, this process ensures that the correct data is going in the correct place with the correct codes associated with the input data, e.g., a code in the legacy system related to tax location is aligned to the proper actual code used in the new system.

Figure 4:
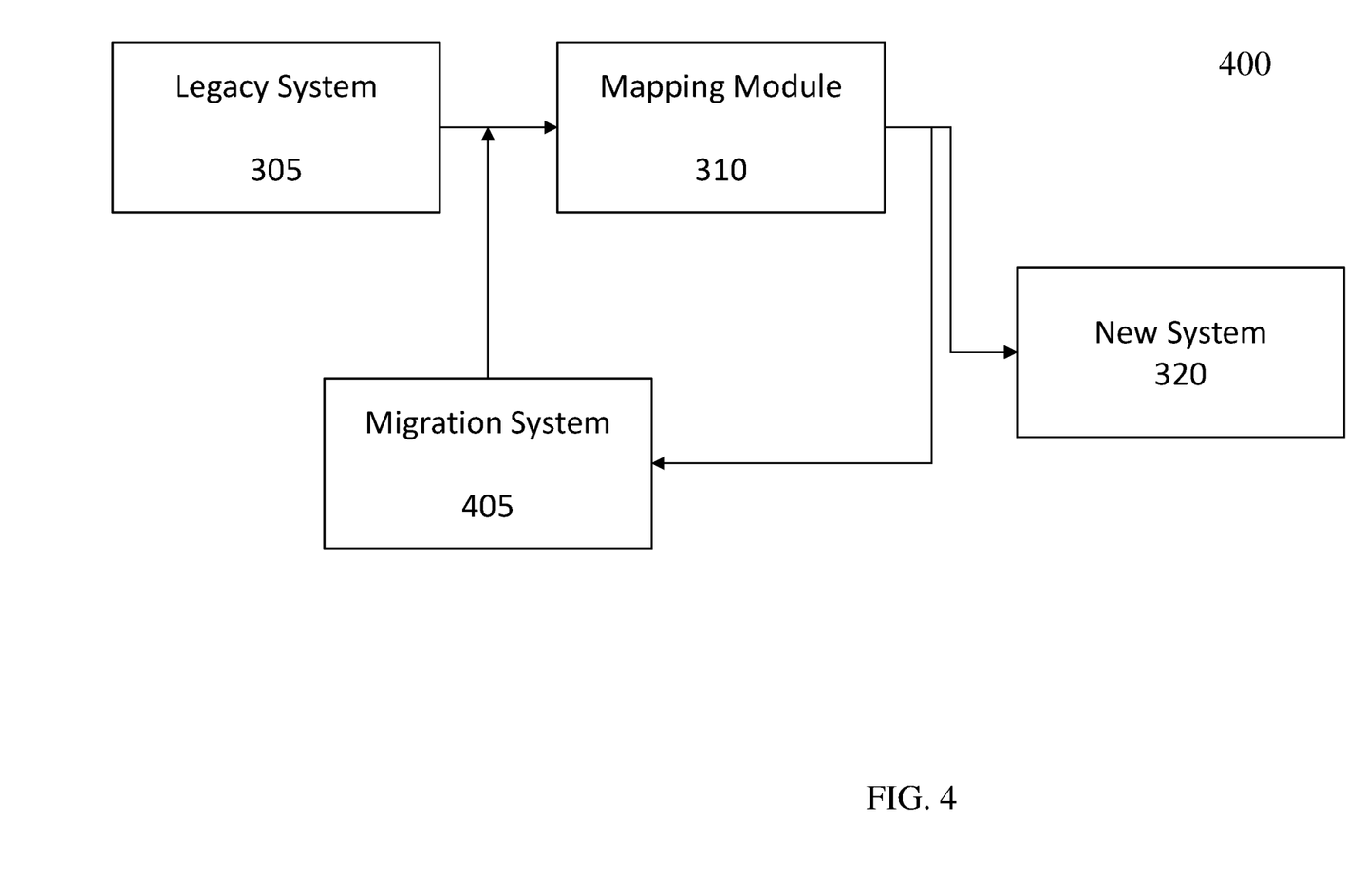
FIGS. 4,5 and 7-9 show different functional block diagrams that illustrate functionality in accordance with different aspects of the present disclosure.

FIG. 4 shows a functional block diagram 400 that illustrates additional functionality of aspects of the present disclosure. In this block diagram 400, the legacy system 300 provides a data stream to the mapping module 310. The output of the mapping module 310 is provided to the migration system 405 and the new system 320. The migration system 405 (which may include the comparison module 325 shown in FIG. 3) may use the output of the mapping module 310 to determine matching patterns and to correct setting/values for the non-matching patterns.

In an iterative process, the output of the migration system 405 can be fed back into the mapping module 310 until all the input data codes in the mapping module 310 have been compared and properly matched to the codes of the legacy system 305. The matched input data codes can then be correlated to the actual values of the new system 320, thereby ensuring that the associated input data from the legacy system 305 or any third-party system is matched to the proper input codes used in the new system 320. The input data which can now be correlated to the correct input data codes can be passed to the payroll engine with confidence that a proper calculation can be made. Accordingly, by having the input codes matched, the new system 320 can properly map the input data of the legacy system 305 or other third-party system comprising payroll data, for example, to the input data codes used in the new system 305 and, hence, identify matching sequences and, once there has been a reconciliation of the input data codes, communicating with an autopay engine. Although not shown, the input data can be transmitted to a payroll engine with the confidence that the output of the payroll engine, e.g., payroll calculations, are correct.

In embodiments, the migration system 405 may be implemented using Online Analytical Processing (OLAP), e.g., technology behind Business Intelligence (BI) applications. As should be understood, OLAP is a powerful technology for data discovery, including capabilities for report viewing, complex analytical calculations, and predictive "what if" scenario (budget, forecast) planning. This provides the ability to analyze payroll runs by leveraging an automatic ability to search for abnormalities in the input data. The migration system may, for example, measure the value of a direct method to reconcile payroll data from a payroll engine to a human resource platform. The migration system 405 may protect data using network authentication protocols, e.g., Kerberos. This is designed to provide strong authentication for client/server applications by using secret-key cryptography. Also, for additional security, the systems described herein do not sore any Sensitive Personal Information (SPI).

Also, by using these protocols and the processed described herein, it is now possible to identify a matching sequence without communicating to a payroll engine and easily identify that the data is clean such as, e.g.,
(i) Active employees without payment;
(ii) Time entered to incorrect (In active employees);
(iii) Hourly rate greater/less then;
(iv) Actual Employee list vs. department (Gaps in HR systems);
(v) Overtime hours per associate;
(vi) Employees with expected deduction/like insurances;
(vii) Direct deposit mistake *very frequent*; and/or
(viii) Compare trends vs previous subset E.g., Deduction volume, etc.

It should be understood by those of skill in the art that the data cleansing will identify and remove errors duplicate data to thus enable faster stabilization of payroll issues. Thus, the processes provided herein provide important features of navigating to parity by validating the inputs for the payroll system.

Figure 5:
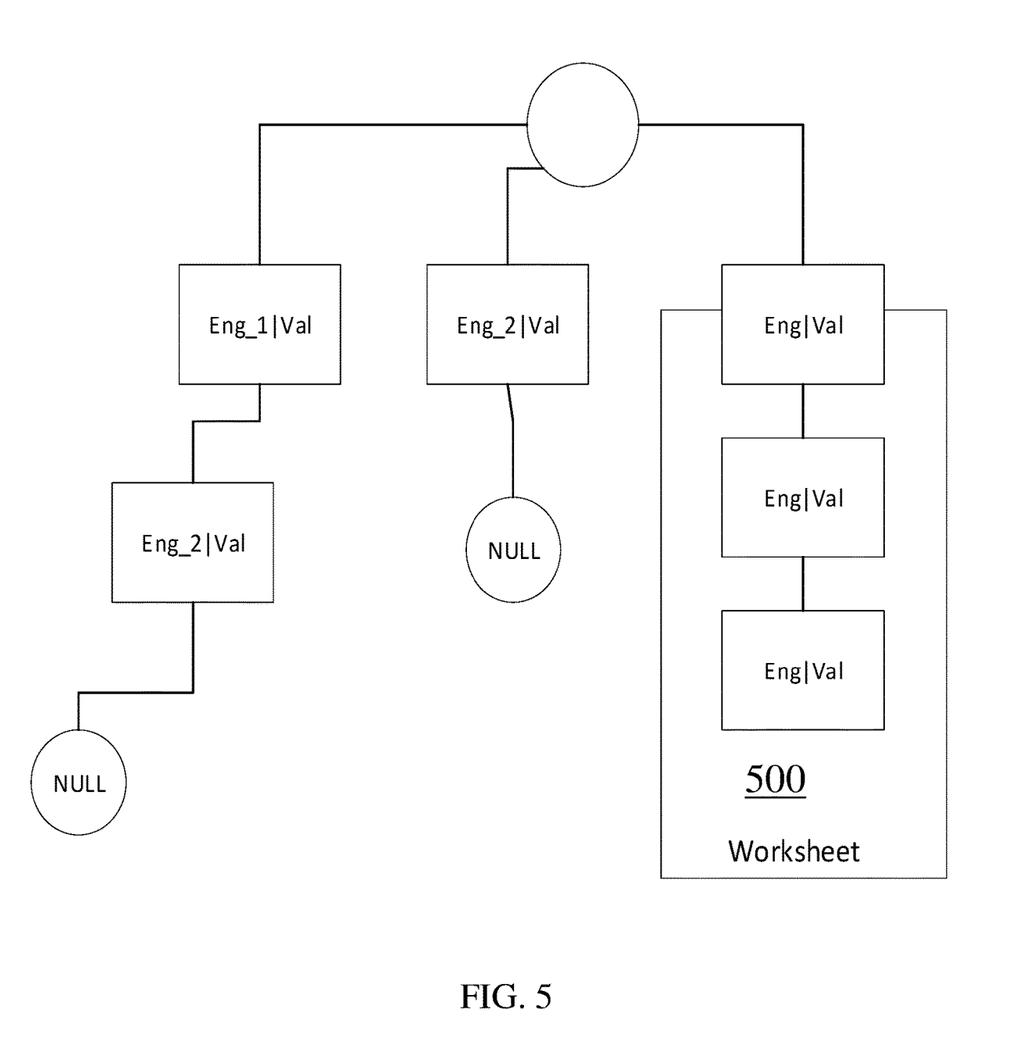

FIG. 5 depicts a chain of data in a payroll engine format in accordance with aspects of the present disclosure. As shown in FIG. 5, a stream of data, e.g., Eng|Val, is provided to a worksheet 500 to a payroll engine. In embodiments, the stream of data may be representative of employment information, e.g., location of employment, home address, wages, bank information, etc. The stream of data may be provided in groups or as singular data point. It should be recognized that the stream of data can be used for hundreds, if not thousands, of employees at a time, representing a very long chain of data. FIG. 5 also shows input data codes, e.g., Eng_1|Val, Eng_2|Val, etc. The input data codes and the steam of data may be mapped to the actual input code of the new system. That is, the input can be used to compare against the actual input codes of the new system as already described herein. In this way, the new system can be certified as having their actual input data codes properly matched to the input data from the payroll engine.

Figure 6:
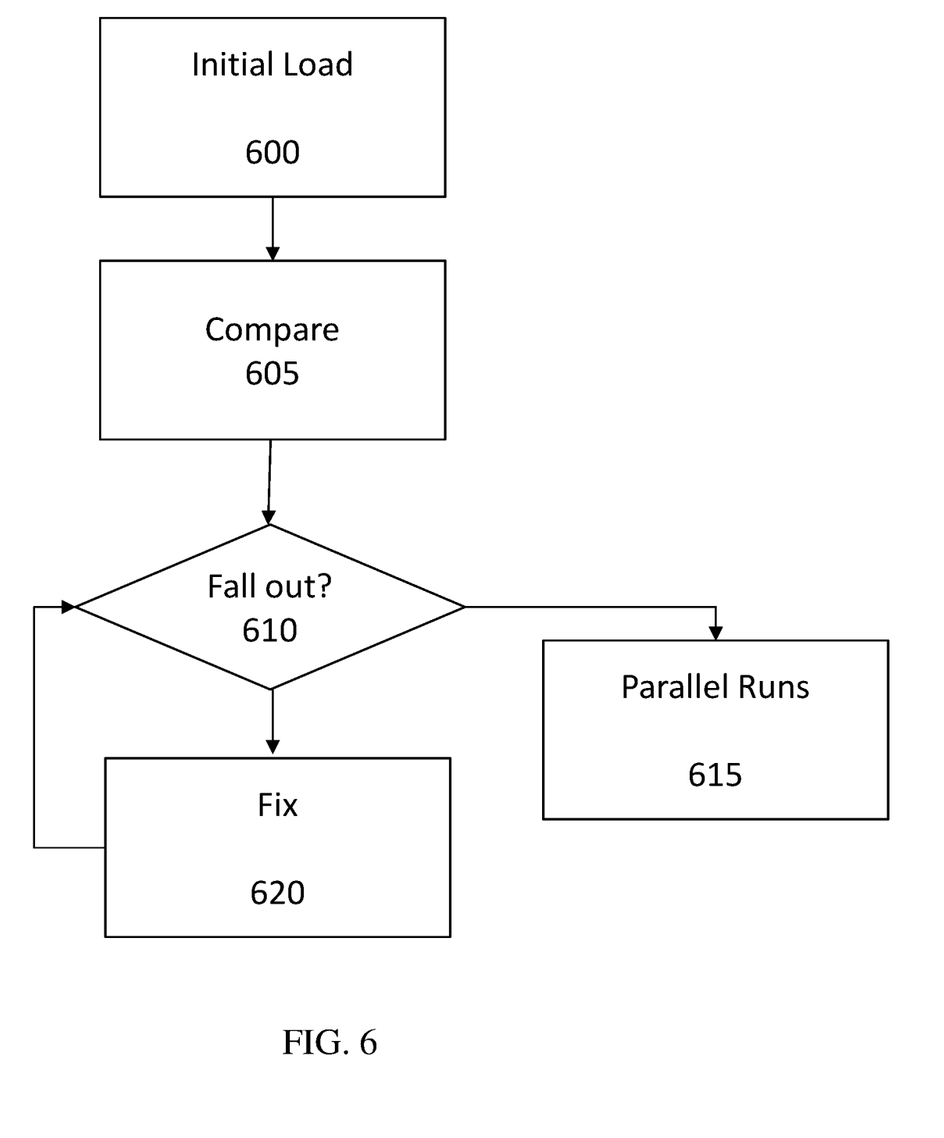
FIG. 6 shows a flow diagram that illustrates additional functionality in accordance with of aspects of the present disclosure.

FIG. 6 shows a flow diagram that illustrates additional functionality of aspects of the present disclosure. In embodiments, the flow diagram shown in FIG. 6 illustrates input validation. The exemplary flow (or other flows) can be illustrative of a system, a method, and/or a computer program product and related functionality implemented on the computing system of FIG. 1, in accordance with aspects of the present disclosure. The computer program product may include computer readable program instructions stored on computer readable storage medium (or media). The computer readable storage medium may include the one or more storage medium as described with regard to FIG. 1, e.g., non-transitory media, a tangible device, etc. The method, and/or computer program product implementing the flow of FIG. 6 (or other flows) can be downloaded to respective computing/processing devices, e.g., computing system of FIG. 1 as already described herein, or implemented on a cloud infrastructure as described with regard to FIG. 2. Accordingly, the processes associated with each flow of the present disclosure can be implemented by special purpose hardware-based systems that perform the specified functions or acts or carry out combinations of special purpose hardware and computer instructions.

More specifically, in FIG. 6, input data may be initially loaded into the system at step 600. The input data may be associated with, for example, time worked, balance of vacation days, benefits or other employee information. The input data may also be associated with input data codes in both the legacy system and the new system. At step 605, the processes may measure inputs to the payroll engine by comparing the inputs to the expected results. At step 610, a determination is made as to whether the expected inputs match to the inputs of the payroll engine. If they do not fall out, e.g., if they match, at step 615, the processes will continue to parallel payroll runs. If they do fall out, e.g., the patterns do not match, then at step 620, the patterns are fixed by adjusting or reloading of the input data to stabilize the data. In embodiments, the steps 610 and 620 may be an iterative process.

Figure 7:
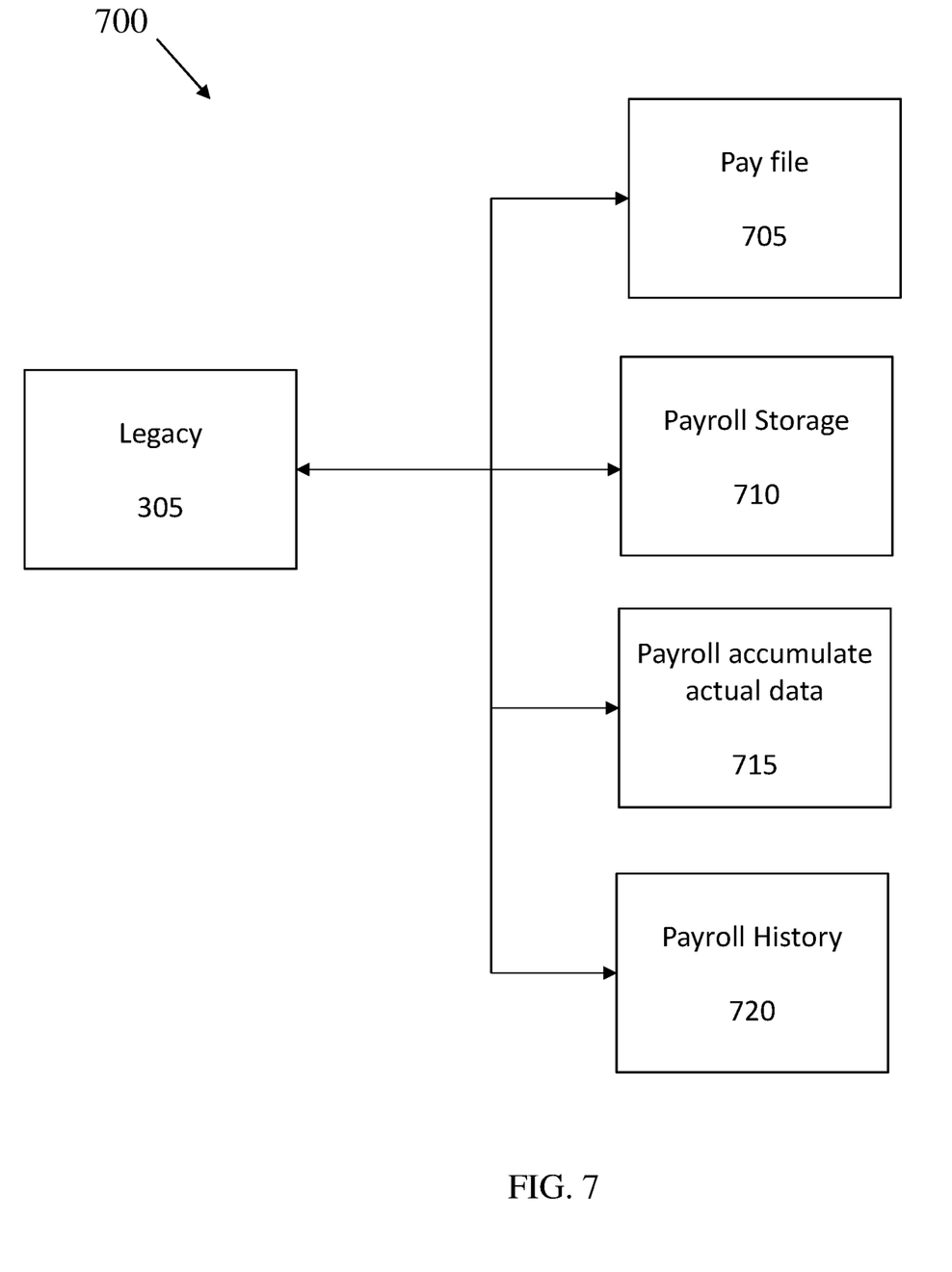

FIG. 7 is a functional block diagram 700 that shows the source of data being provided to the legacy system (which will need to be used in the new system and by the payroll engine) in accordance with aspects of the present disclosure. In embodiments, the sources of data may be from multiple external sources. For example, the sources may be a pay file 705. In embodiments, the pay file 705 may be data for any given period provided by a data pool or on demand, as examples. The data may be the data input code and respective values such as those described provided to the worksheet 500 shown in FIG. 5. The data may also be data from a payroll storage 710 and payroll history 720. This data may be salary information, e.g., salaried vs. hourly, deductions, etc. The data may also be accumulated data 715. In embodiments, the accumulated data 715 may be, for example, taxes paid by quarter, retirement plan payments, quarterly hours worked, etc. or other data accumulated over time The data obtained from the many different sources may then be used to perform the mapping functions to perform verification of the data.

Figure 8:
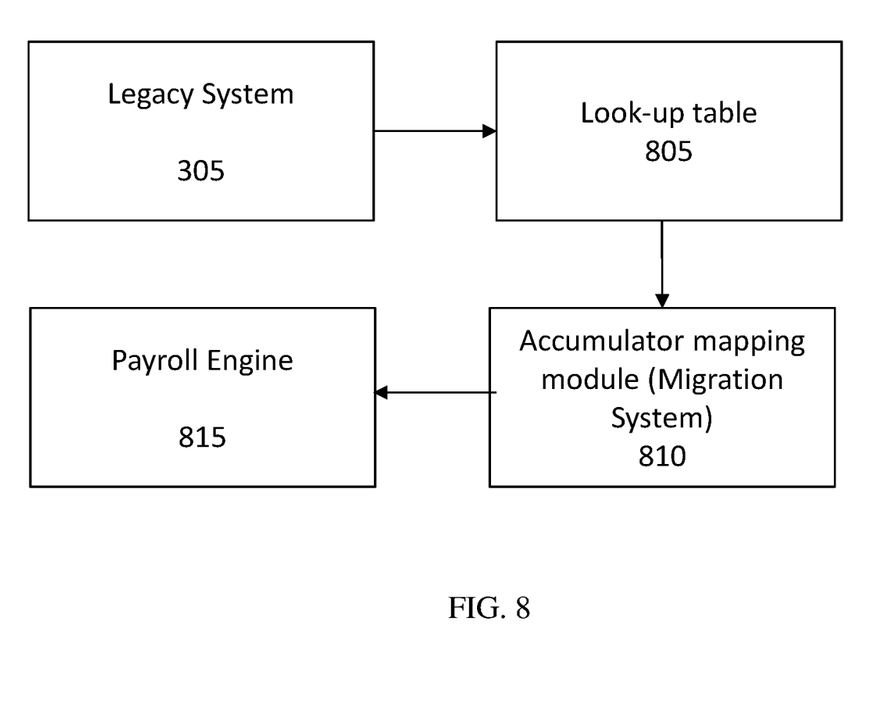

FIG. 8 shows a functional block diagram that explains how to make a projection from payroll source data in accordance with aspects of the present disclosure. In this block diagram, the legacy system 305 is passing data through a lookup table 805. In embodiments, the look-up table 805 may be provided by the projected input data codes as described with respect to FIG. 3. In embodiments, the look-up table may be generated using the information from the mapping module 310 of FIG. 3. The projected input data codes then pass to an accumulator mapping module 810 (e.g., migration system). At this stage, the mapping of the actual data codes and the projected data can be mapped on an aggregate basis as described herein, i.e., translate the data input codes from the legacy system to the new system. The data can then be used in the payroll engine 815.

Figure 9:
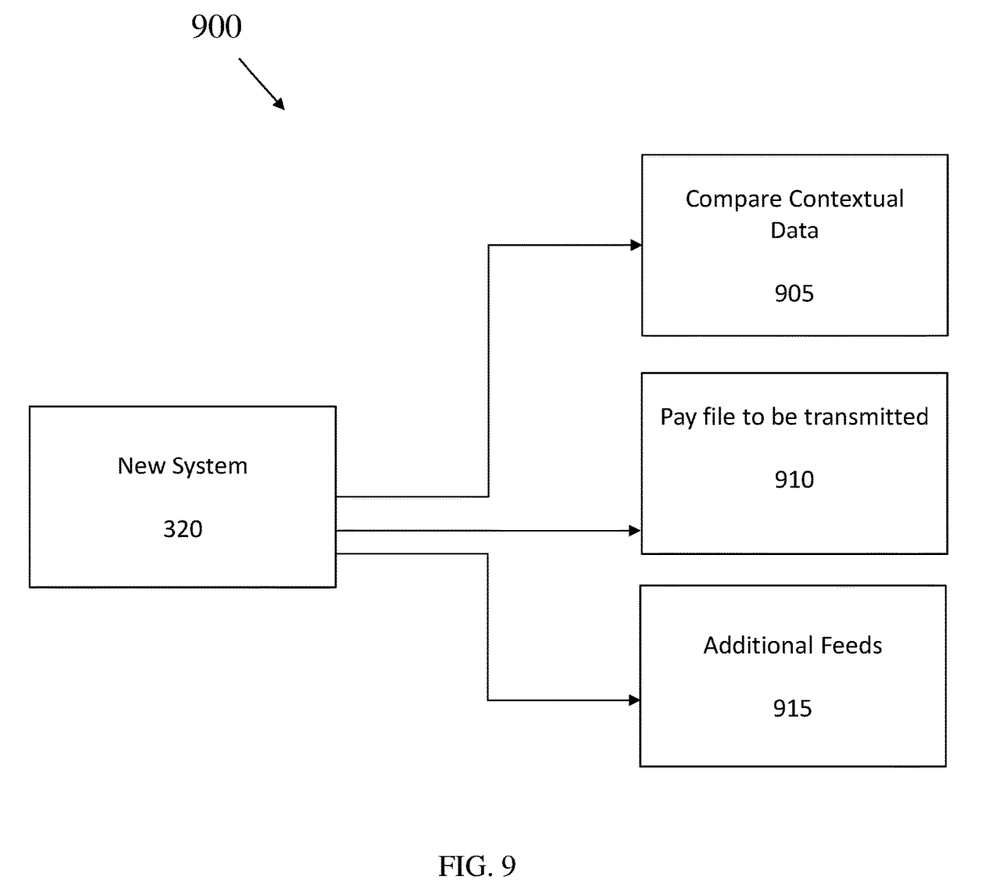

FIG. 9 shows a functional block diagram 900 that illustrates additional functionality in accordance with aspects of the present disclosure. For example, FIG. 9 explains verification of the data within the new system 320. For example, box 905 provides a comparison of contextual data, e.g., accumulated actuals. Box 910 shows the pay file, which is data that has been transmitted, taken from some API access. Box 915 shows additional data which may have already received.

The foregoing examples have been provided merely for the purpose of explanation and are in no way to be construed as limiting of the present disclosure. While aspects of the present disclosure have been described with reference to an exemplary embodiment, it is understood that the words which have been used herein are words of description and illustration, rather than words of limitation. Changes may be made, within the purview of the appended claims, as presently stated and as amended, without departing from the scope and spirit of the present disclosure in its aspects. Although aspects of the present disclosure have been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A method of migrating data comprising:
    receiving, by a computer system, projected input codes including instructions of a first system that cause an application to perform one or more actions related to payroll processing;
    determining, by the computer system, that the projected input codes of the first system are set to be migrated to a second system;
    receiving, by the computer system, from the second system, a transmission that includes actual input codes used by the second system to instruct the application to perform the one or more actions;
    comparing, by the computer system responsive to receiving the actual input codes, the projected input codes to the actual input codes;
    detecting, by the computer system, responsive to comparing the projected input codes to the actual input codes, differences between the projected input codes and the actual input codes;
    converting, by the computer system, prior to the second system executing one or more instructions, the projected input codes of the first system to the actual input codes of the second system such that the second system executes one or more second instructions to cause the second system to perform the one or more actions; and
    providing, by the computer system, the actual input codes of the second system, converted from the projected input codes of the first system, to the second system to cause the second system to perform the one or more actions, wherein the actual input codes are provided to the second system instead of the projected input codes.

2. The method of claim 1, further comprising migrating, by the computer system, input data associated with the projected input codes to the second system.

3. The method of claim 2, further comprising streaming, by the computer system, the input data from the second system to the application.

4. The method of claim 1, further comprising identifying and matching, by the computer system, sequences of the projected input codes of the first system to the actual input codes of the second system such that the second system understands data associated with the projected input codes.

5. The method of claim 1, further comprising correcting, by the computer system, values of non-matching patterns of the projected input codes to the actual input codes, prior to migration of input data to the application.

6. The method of claim 1, wherein the first system is a legacy human resource system, wherein the second system is a different human resource system, and wherein the projected input codes are different than the actual input codes.

7. The method of claim 1, wherein the projected input codes are mapped to the actual input codes of the second system.

8. The method of claim 1, further comprising certifying, by the computer system, the second system when the projected input codes and the actual input codes are aligned.

9. The method of claim 1, wherein comparing, by the computer system, the projected input codes to the actual input codes is performed in an iterative process.

10. The method of claim 1, further comprising measuring, by the computer system, a data gap between an expected result and an actual result using the actual input codes.

11. A computer program product comprising one or more computer readable storage media having program instructions collectively stored on the one or more computer readable storage media, the program instructions executable to:
    receive projected input codes including instructions of a first system that cause an application to perform one or more actions related to payroll processing;
    determine that the projected input codes of the first system are set to be migrated to a second system;
    receive, from the second system, a transmission that includes actual input codes used by the second system to instruct the application to perform the one or more actions;
    compare, responsive to receipt of the actual input codes, the projected input codes to the actual input codes;
    detect, responsive to comparison of the projected input codes to the actual input codes, differences between the projected input codes and the actual input codes;
    convert, prior to the second system executing one or more first instructions, the projected input codes of the first system to the actual input codes of the second system such that the second system executes one or more second instructions to cause the second system to perform the one or more actions; and
    provide the actual input codes of the second system, converted from the projected input codes of the first system, to the second system to cause the second system to perform the one or more actions, wherein the actual input codes are provided to the second system instead of the projected input codes.

12. The computer program product of claim 11, further comprising the program instructions executable to:
    identify and match sequences of the projected input codes to the actual input codes such that a non-originating system understands data associated with the projected input codes.

13. The computer program product of claim 12, further comprising the program instructions executable to:
    correct values of non-matching patterns of the projected input codes to the actual input codes, prior to migration.

14. The computer program product of claim 13, wherein the projected input codes are mapped to the actual input codes.

15. The computer program product of claim 13, further comprising the program instructions executable to:
    certify the non-originating system when the projected input codes and the actual input codes are aligned.

16. The computer program product of claim 12, wherein to compare the projected input codes and the actual input codes is performed on an input perspective.

17. The computer program product of claim 12, further comprising the program instructions executable to:
    compare input data of the application to input data that is correlated to the actual input codes.

18. The computer program product of claim 12, further comprising the program instructions executable to:
    receive input data from multiple sources and aligning the input data to the actual input codes.

19. A system comprising:
    a processor, a computer readable memory, one or more computer readable storage media, and program instructions collectively stored on the one or more computer readable storage media, the program instructions executable to:

receive projected input codes including instructions of a first system that cause an application to perform one or more actions related to payroll processing;

determine that the projected input codes of the first system are set to be migrated to a second system;

receive from the second system, a transmission that includes actual input codes used by the second system to instruct the application to perform the one or more actions;

compare, responsive to receipt of the actual input codes, the projected input codes to the actual input codes;

detect, responsive to comparison of the projected input codes to the actual input codes, differences between the projected input codes and the actual input codes;

convert, prior to the second system executing one or more instructions, the projected input codes of the first system to the actual input codes of the second system such that the second system executes one or more second instructions to cause the second system to perform the one or more actions; and provide the actual input codes of the second system, converted from the projected input codes of the first system, to the second system to cause the second system to perform the one or more actions, wherein the actual input codes are provided to the second system instead of the projected input codes.

* * * * *